United States Patent
Sadasivam et al.

(10) Patent No.: US 12,554,717 B2
(45) Date of Patent: Feb. 17, 2026

(54) DYNAMICALLY SUBSTITUTING A MODIFIED QUERY BASED ON PERFORMANCE ANALYSIS

(71) Applicant: Microsoft Technology Licensing, LLC, Redmond, WA (US)

(72) Inventors: Ganapathi Sadasivam, Sammamish, WA (US); Andres Martinez Andrade, Mercer Island, WA (US); Kishore Kumar Penugonda, Bellevue, WA (US); Yanli Tong, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 5 days.

(21) Appl. No.: 17/823,060

(22) Filed: Aug. 29, 2022

(65) Prior Publication Data

US 2024/0004879 A1    Jan. 4, 2024

Related U.S. Application Data

(60) Provisional application No. 63/358,071, filed on Jul. 1, 2022.

(51) Int. Cl.
*G06F 16/2453* (2019.01)
*G06F 16/242* (2019.01)

(52) U.S. Cl.
CPC ...... *G06F 16/24549* (2019.01); *G06F 16/242* (2019.01); *G06F 16/24542* (2019.01)

(58) Field of Classification Search
CPC ............. G06F 16/24549; G06F 16/242; G06F 16/24542
See application file for complete search history.

(56) References Cited

U.S. PATENT DOCUMENTS

| | | |
|---|---|---|
| 6,804,682 B1 | 10/2004 | Kemper et al. |
| 7,370,318 B1 | 5/2008 | Howe et al. |
| 10,157,055 B2 | 12/2018 | Tamir et al. |

(Continued)

OTHER PUBLICATIONS

"Job Queue", Retrieved from: https://en.wikipedia.org/w/index.php?title=Job_queue&oldid=1091806931, Jun. 6, 2022, 1 Page.

(Continued)

*Primary Examiner* — Khanh B Pham
*Assistant Examiner* — Samuel C Sharpless, III
(74) *Attorney, Agent, or Firm* — Foley IP Law, PLLC

(57) ABSTRACT

The disclosure herein describes analyzing queries and dynamically modifying those queries based on the analysis. An indication that a query is to be executed by a first process is detected. It is determined that an analysis results data store does not include an active analysis result for the query using a query identifier of the query and, as a result, a modified instance of the query is generated using a modification pattern. The query and the modified instance of the query are analyzed based on a performance metric using a second process that is independent of the first process. An active analysis result of the query is recorded based on the analysis, wherein the analysis result indicates whether future executions of the query should be modified using the modification pattern. Further, in some examples, analysis results expire, such that associated queries are reanalyzed to generate active analysis results periodically.

13 Claims, 9 Drawing Sheets

(56) References Cited

U.S. PATENT DOCUMENTS

| | | |
|---|---|---|
| 10,558,458 B2 | 2/2020 | Iwanir et al. |
| 2016/0232206 A1* | 8/2016 | Hayamizu ............ G06F 16/2455 |
| 2018/0225331 A1* | 8/2018 | Agrawal ............ G06F 16/24549 |
| 2019/0236188 A1 | 8/2019 | Mckenna |
| 2019/0354622 A1* | 11/2019 | Sheldon ................ G06F 16/285 |
| 2021/0019319 A1 | 1/2021 | Vogelsgesang et al. |
| 2022/0147397 A1 | 5/2022 | Bhattacharya et al. |
| 2022/0245148 A1* | 8/2022 | Hwang ............... G06F 11/3419 |

OTHER PUBLICATIONS

"International Search Report and Written Opinion Issued in PCT Application No. PCT/US23/024502", Mailed Date: Sep. 1, 2023, 12 Pages.

Murray, et al., "Steno: Automatic Optimization of Declarative Queries", In Proceedings of the 32nd ACM SIGPLAN Conference on Programming Language Design and Implementation, Jun. 4, 2011, 11 Pages.

* cited by examiner

TABLES: SQL

QUEUE 512

FORM NAME: STR
DS ROOT NAME: STR
QUERY HASH: LONG
PACKED QUERY:
CONTAINER

**QUERY EXECUTION
TIME 530**

FORM NAME: STR
DS ROOT NAME: STR
QUERY HASH: LONG
USING TOP: BOOLEAN
EXECUTION TIME: TIME
CREATED DATE: DATE

ANALYSIS RESULTS 520

FORM NAME: STR
DS ROOT NAME: STR
QUERY HASH: LONG
APPLY TOP: BOOLEAN
CREATED DATE: DATE

DATA CONTRACTS: X++

LIST PAGE QUERY 534

FORM NAME: STR
DS ROOT NAME: STR
QUERY HASH: LONG
QUERY: OBJECT

500

FIG. 5 ated functionality;
DYNAMICALLY SUBSTITUTING A MODIFIED QUERY BASED ON PERFORMANCE ANALYSIS

CROSS-REFERENCE TO RELATED APPLICATION

This application claims priority to U.S. Provisional Patent Application No. 63/358,071, entitled "DYNAMICALLY SUBSTITUTING A MODIFIED QUERY BASED ON PERFORMANCE ANALYSIS," filed on Jul. 1, 2022, the disclosure of which is incorporated herein by reference in its entirety.

BACKGROUND

In modern computing systems, queries provide vital means for organizing, accessing, and/or searching for data within large data sets. In many examples, there are queries that are executed frequently on the same of different data sets to obtain large quantities of data results (e.g., executing a sales transaction retrieval query on data sets of different regions several times per day). A query can perform very differently depending on the distribution and/or volume of data in the target data sets.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for analyzing queries and dynamically modifying those queries based on the analysis is described. An indication that a query is to be executed by a first process is detected. It is determined that an analysis results data store does not include an active analysis result for the query using a query identifier of the query and, as a result, a modified instance of the query is generated using a modification pattern. The query and the modified instance of the query are analyzed based at least in part on a performance metric using a second process that is independent of the first process. An active analysis result of the query is recorded in the analysis results data store based on the analysis, wherein the analysis result indicates whether future executions of the query should be modified using the modification pattern.

BRIEF DESCRIPTION OF THE DRAWINGS

The present description will be better understood from the following detailed description read in light of the accompanying drawings, wherein:

FIG. 5 is a diagram illustrating the data tables of various data entities used in FIGS. 2-4;

Corresponding reference characters indicate corresponding parts throughout the drawings. In FIGS. 1 to 9, the systems are illustrated as schematic drawings. The drawings may not be to scale.

DETAILED DESCRIPTION

Figure 1:
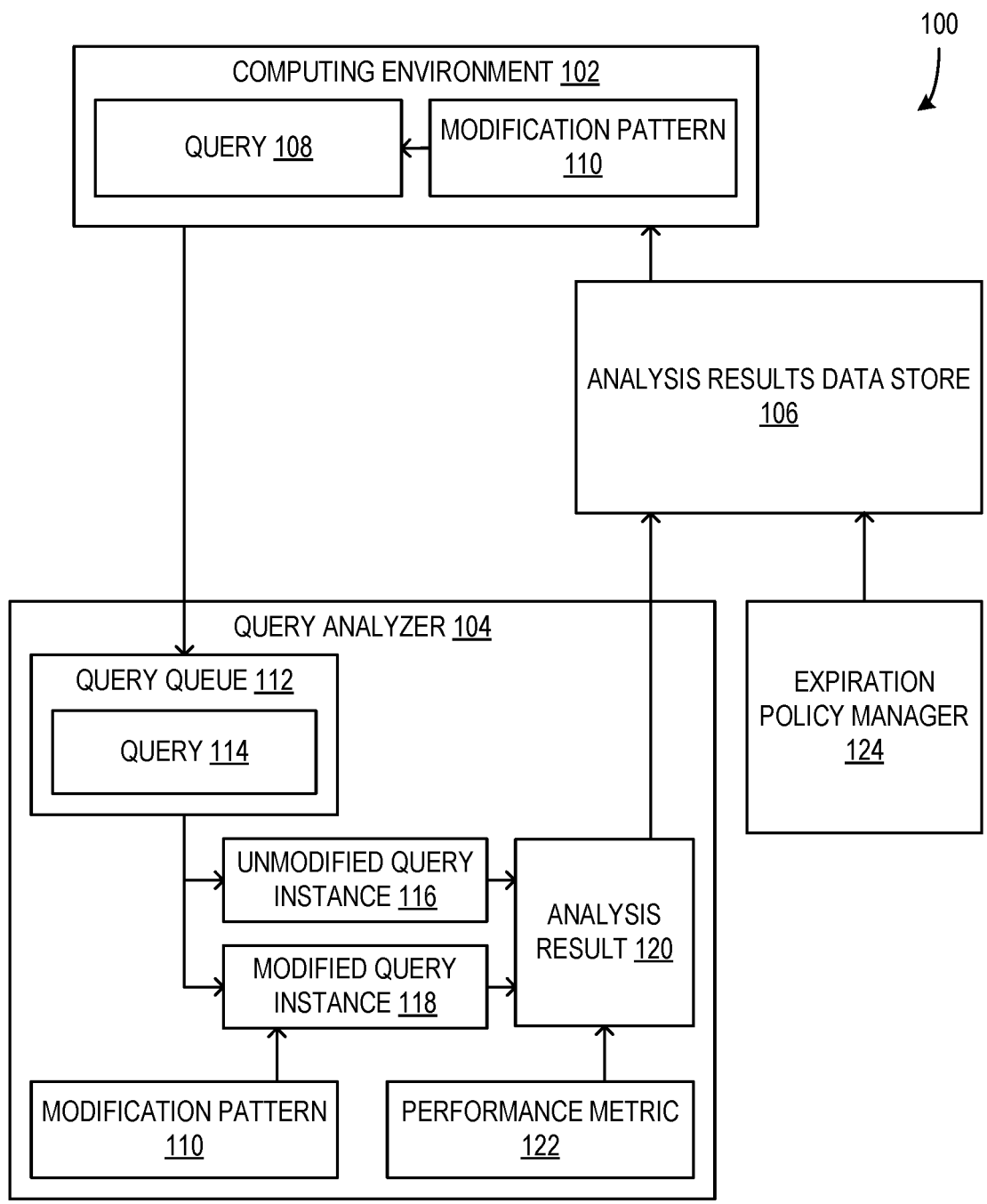
FIG. 1 is a block diagram illustrating a system configured to analyze queries and to improve the performance of the analyzed queries based on dynamic modification/substitution of alternate queries.

Aspects of the disclosure provide a computerized method and system for dynamically substituting a modified query for a requested query based on recent performance analysis of the query. The disclosure describes detecting when a query is going to be executed and determining whether analysis results for the query are available. If available, the analysis results indicate whether a modified version of the query should be substituted for the query. In such cases, the query is executed unmodified or modified and executed based on the analysis results. Alternatively, if no analysis results are available, the query is added to an analysis queue such that the query is analyzed later and the query is executed in a default mode (e.g., the query is executed unmodified).

Queries are analyzed by generating a modified instance of the query using a modification pattern and then executing the query unmodified, executing the modified instance of the query, and comparing the performance of the two executions based on a performance metric. If the performance of the modified instance exceeded the performance of the unmodified query, an analysis result is recorded that indicates that the query should be modified using the modification pattern prior to future executions. Alternatively, if the performance of the unmodified query exceeded the performance of the modified instance, an analysis result is recorded that indicates that the query should not be modified prior to future executions. In some examples, the analysis results expire after a defined time period, such that the disclosure is configured to reanalyze queries after the associated results expire.

The disclosure operates in an unconventional manner at least by analyzing the performance of queries in a computing system and then using the analysis results to dynamically modify those queries prior to future executions to improve the performance thereof. The disclosure is configured to execute an unmodified instance and a modified instance of a query using background processes and the performance of those instances is compared. An analysis result is generated that indicates whether future instances of that query should be modified or not. Thus, the execution time and/or resource usage of future query executions is reduced and the query modification, if it is done, can be performed without interfering with a user experience of the system.

Further, the disclosure is configured to re-analyze queries periodically by causing analysis results to become expired after defined time intervals. Because many different factors can affect performance of queries and such factors can change over time, the disclosure prevents past analysis results from negatively affecting the performance of queries over long time periods.

When the disclosed features are enabled, the kernel of the system analyzes queries of data sources to identify any queries that could potentially benefit when the kernel applies a modification pattern to them (e.g., adding a top statement to a Structured Query Language (SQL) query to control the quantity of results returned). The disclosure is configured to find modified or alternate queries that could perform well without regressing the user's interaction or performance of the application.

In some examples, the disclosure is configured to record the expensive SQL queries from user interactions. Using a background task, the disclosed framework determines if alternate SQL queries could perform better than the default SQL queries through analysis. This decision, or analysis result, is saved for future reference. If the framework has previously determined that a modified or alternate SQL query is better, during the next occurrence of the query, the framework will substitute the modified or alternate query dynamically. This approach also introduces expiry dates for the stored analysis results and associated modified queries. At the time of expiration, the analyzed SQL queries will be evaluated again, allowing for the disclosure to continuously update its stored analysis results over time. It should be understood that, while many examples described herein describe SQL queries, in other examples, other types of queries, executable functions, or other applications are used with the disclosure without departing from the description.

In some cases, the same query can perform very differently depending on the data distributions and volume at different times. With 'cost-based' optimizers and sampled statistics, most modern relational database management systems do an excellent job of finding suitable plans to work on different data distributions. But all data engines run into trouble coming up with high-performing execution plans from time to time. The disclosure describes a framework configured to analyze alternate queries in the background to evaluate what works best for that customer's current conditions. Further, the framework is configured to dynamically substitute the alternate queries for the default queries when applicable. This approach provides better cover for better performance when possible.

Further, in some examples, the disclosure is configured to queue queries for performance analysis in cases where no active analysis results are available. This prevents the analysis from interrupting the functionality of the system during runtime. Queries that are queued for analysis are executed in a default mode (either modified or unmodified depending on settings) when they are queued for analysis such that, after the analysis occurs, future executions of the query can benefit from the determination made during analysis.

Additionally, or alternatively, the disclosure is configured to make modifications to queries in a largely unnoticeable way in order to avoid negatively affecting the runtime operation of the system (e.g., slowing down the execution of processes such that a user notices, etc.). Still further, the disclosure is configured to automatically adjust whether queries are automatically modified at runtime based on the expiration of analysis results and the following repeated analysis of queries after the results have expired. This provides flexibility that accounts for changes in the data structures that are accessed by the queries with little or no manual intervention required.

FIG. 1 is a block diagram illustrating a system 100 configured to analyze queries 108 and to improve the performance of the analyzed queries 108 based on dynamic modification/substitution of alternate queries.

Figure 9:
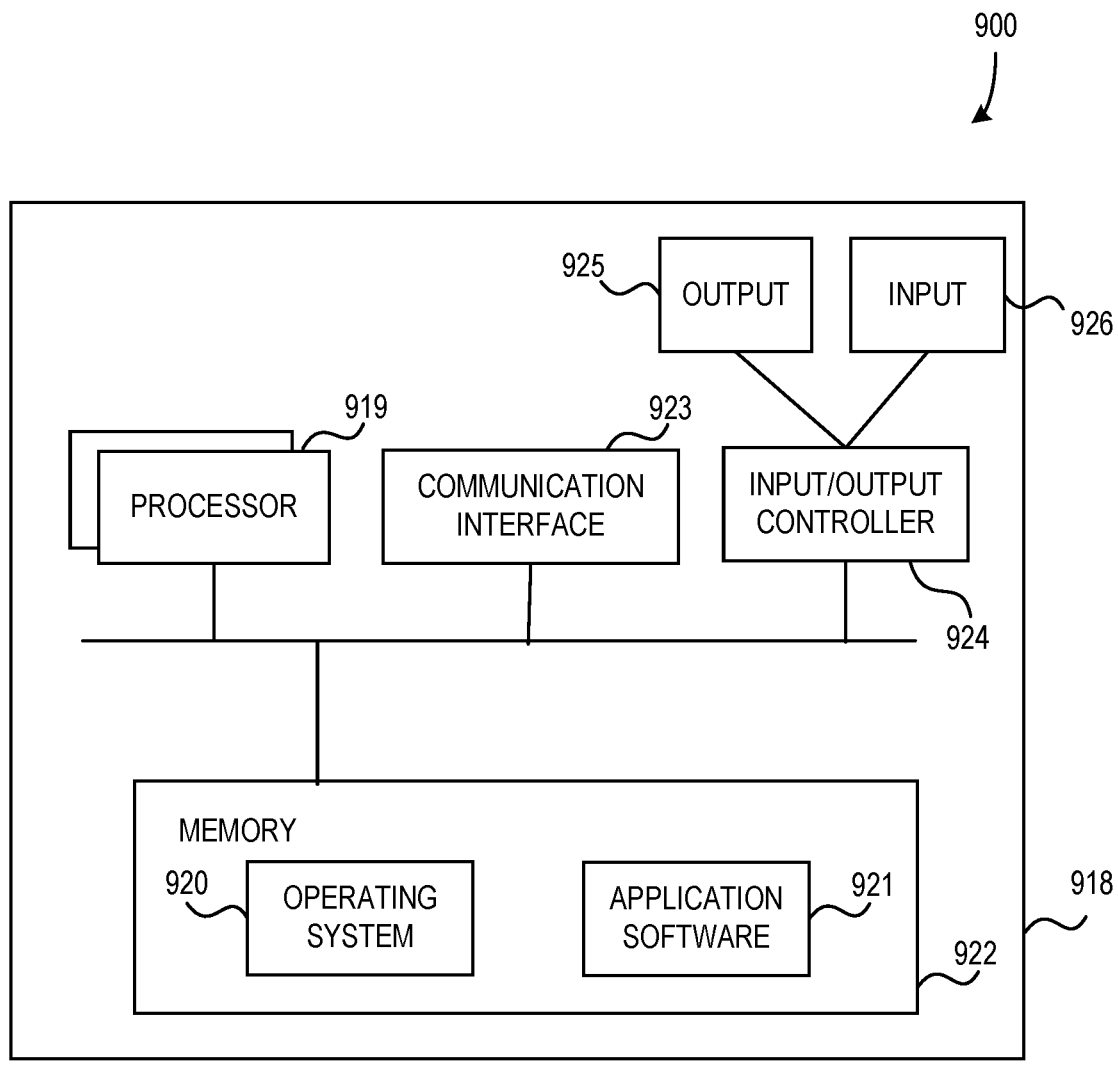
FIG. 9 illustrates an example computing apparatus as a functional block diagram.

In some examples, the system 100 includes a computing device (e.g., the computing apparatus of FIG. 9). Further, in some examples, the system 100 includes multiple computing devices that are configured to communicate with each other via one or more communication networks (e.g., an intranet, the Internet, a cellular network, other wireless network, other wired network, or the like). In some such examples, entities of the system 100 are configured to be distributed between the multiple computing devices and to communicate with each other via network connections. For instance, in an example, the computing environment 102 is located and/or executed on a first computing device or set of computing devices while the query analyzer 104 is located and/or executed on a second computing device or set of computing devices. The computing environment 102 and the query analyzer 104 are then configured to communicate with each other via a network connection as described herein.

The system 100 includes a computing environment 102 upon which queries 108 are executed, a query analyzer 104 with which queries 114 are analyzed, analysis results 120 stored in an analysis results data store 106, and an expiration policy manager 124 configured to control the expiration of results in the data store 106.

The computing environment 102 includes hardware, firmware, and/or software configured to execute queries 108 and/or otherwise perform convention computing operations. In some examples, the computing environment 102 includes one computing device while in other examples, the computing environment 102 includes multiple computing devices. Further, in some examples, the computing environment 102 includes one or more data stores that store one or more data sets upon which the queries 108 are executed.

Additionally, in some examples, the computing environment 102 is configured to execute queries 108 associated with multiple customers or other entities which have separate data sets upon which the queries 108 are executed (e.g., a customer A executes queries on a data set A associated with the customer A and a customer B executes queries on a data set B associated with the customer B). In some such examples, the analysis results 120 stored in the analysis results data store 106 are specific to the entity for which a query 108 was analyzed, such that results associated with query executions by customer A are not used to determine whether to modify a query to be executed by customer B. Alternatively, in other examples, the results associated with customer A may be used to determine whether to modify a query of customer B.

In some examples, the computing environment 102 detects when a query 108 is to be run and then determines whether there are any active analysis results 120 for the query 108 stored in the analysis results data store 106. If there is an active result, the computing environment 102 uses an indication (e.g., a Boolean parameter value or the like) in the active result to determine whether to modify the query 108 using the modification pattern 110 prior to execution. If there is not an active analysis result in the data store 106, the computing environment 102 sends the query 108 to the query analyzer 104 to become a queued query 114 in the query queue 112. In some such examples, after sending the query 108 to be analyzed, the computing environment 102 also executes the query 108 in a default mode. In many examples, the default mode is to execute the query 108 without modification, but in other examples, the computing environment 102 is configured to modify queries 108 by default if there are not analysis results for the query 108 that indicate otherwise.

The query analyzer 104 includes hardware, firmware, and/or software configured to queue queries 114 for analysis, analyze queries 114 using unmodified query instances 116 and modified query instances 118, and generate analysis results 120 based on a performance metric 122. The analysis results 120 are then sent to or otherwise stored in the analysis results data store 106 as described herein. In some examples, the data store 106 is part of and/or otherwise associated with the query analyzer 104 such that the computing environment 102 must communicate with the query analyzer 104 to obtain results from the data store 106. Alternatively, in other examples, the data store 106 is separate from the query analyzer 104 or otherwise available to the computing environment 102 directly, as illustrated in FIG. 1.

In some examples, the query analyzer 104 queues the queries 114 received from computing environments 102 in a query queue 112. When the query analyzer 104 performs analysis, it obtains one or more queries 114 from the queue 112 to analyze. In some such examples, the query analyzer 104 is configured to analyze the queries 114 in batches, such that a batch of queries 114 is obtained from the queue 112 at once and analyzed in a batch. Further, in some examples, the query analyzer 104 is configured to perform analysis of queries periodically (e.g., once a day) or based on some other trigger (e.g., the quantity of queries 114 in the queue 112 reaches a threshold).

During analysis, the query analyzer 104 generates or otherwise obtains an unmodified query instance 116 and a modified query instance 118 of the query 114 being analyzed. The modified query instance 118 is modified using a modification pattern 110, which is the same modification pattern 110 that is used by the computing environment 102 to modify queries 108 prior to execution. The query instances 116 and 118 are executed (e.g., in the background from other operations of the computing environment 102) and performance metrics 122 of the executions of the instances 116 and 118 are collected (e.g., execution time of each instance, resources used by each instance, or the like). The collected performance metrics 122 of the two instances 116 and 118 are compared and an analysis result 120 is generated therefrom. In some examples, if the modified query instance 118 performed better than the unmodified query instance 116, the analysis result 120 is configured to indicate that the associated query 108 should be modified with the modification pattern 110 prior to future executions. Alternatively, if the unmodified query instance 116 performed better than the modified query instance 118, the analysis result 120 is configured to indicate that the associated query 108 should not be modified with the modification pattern 110 prior to future executions.

In some examples, the modification pattern 110 includes adding a statement that limits or otherwise controls the quantity results that are returned by the query during execution (e.g., a top statement in an SQL query). In other examples, more and/or different modification patterns 110 are used. For instance, in other examples, modification patterns 110 include modifications that alter resources used by the query, modifications that change aspects of the data sets targeted by the query, and/or modifications that change batch size or other parameters of the query.

Further, in some examples, the modification pattern or patterns 110 are defined as part of the configuration of the query analyzer 104. In such examples, the modification pattern 110 is provided to the computing environment 102 for use in modifying queries 108 as described herein. For instance, in an example, the modification pattern 110 is provided to the computing environment 102 during a process of installation or activation of the query analyzer 104 with respect to the computing environment 102.

Alternatively, or additionally, the modification pattern 110 is provided to the computing environment 102 at other points in communication with the computing environment 102 and/or the modification pattern 110 is provided to the computing environment 102 using the analysis results 120 in the analysis results data store 106. In such examples, the modification pattern 110 is included in analysis results 120 that indicate that the query should be modified with the included modification pattern 110. In examples where there are multiple modification patterns 110 being analyzed by the query analyzer 104, the query analyzer 104 executes modified query instances 118 for each modification pattern 110 and, when one of the modified query instances 118 is found to perform the best with respect to a performance metric 122, the query analyzer 104 generates an analysis results 120 that indicates that the modification pattern 110 associated with the best-performing modified query instance 118 should be used to modify queries 108 going forward. The data necessary to modify a query using that modification pattern 110 is included in the analysis result 120, such that the computing environment 102 is enabled to perform the query modification when it accesses the analysis result 120.

In some examples, the performance metric 122 is defined as the execution time of the query instances 116 and 118. In other examples, more and/or different performance metrics 122 are used. For instance, in other examples, performance metrics 122 include processing resources used, memory resources used, bandwidth used, or the like. Further, in some examples, multiple performance metrics 122 are used in combination and some or all of the performance metrics 122 used are weighted using defined weight factors when comparing performances between the query instances 116 and 118. For instance, in an example where execution time and memory usage are compared between the two instances 116 and 118, a normalized execution time value is weighted using a 0.7 weight factor and a normalized memory usage value is weighted using a 0.3 weight factor, such that the execution time is weighed more heavily in the analysis, but the memory usage still has an effect.

In some examples, the disclosed framework is configured to collect performance metrics (e.g., time of execution) of a query when it is executed outside of the query analyzer 104, such as when it is executed in the computing environment 102. In some such examples, the query analyzer 104 is configured to only execute the modified query instance 118 and then compare its performance to the collected performance metrics of the execution of the query 108 in the computing environment 102. In this manner, the quantity of processing performed by the query analyzer 104 is reduced.

The analysis results data store 106 stores the analysis results 120 and enables the computing environment 102 to obtain analysis result data about queries 108 that are to be executed. Further, the analysis results data store 106 is managed by an expiration policy manager 124, which is configured to deactivate or otherwise remove analysis results that have expired in the data store 106. For instance, in an example, the expiration time interval of the analysis results is a week, or seven days. The stored analysis results in the data store 106 include a timestamp indicating when they were initially recorded in the data store 106 and an indicator that indicates whether the analysis result is active or inactive. The expiration policy manager 124 scans the analysis results in the data store 106 and if a timestamp of an analysis result indicates that that result has been active in the data store 106 over a threshold or expiry time, such as a week or another expiration time interval, the expiration policy manager 124 changes the indicator of the analysis result to indicate that it is inactive. Additionally, or alternatively, the expiration policy manager 124 removes the expired analysis result from the data store 106 or otherwise indicates that the analysis result should be removed by an entity configured to do so.

In some examples, the expiration policy manager 124 is configured to apply different expiration time intervals to the analysis results associated with different customers and/or entities. In such examples, the manager 124 is configured to check the timestamp of each analysis result and an indicator indicating the entity with which the result is associated. The manager 124 then uses the expiration time interval associated with that entity to evaluate the analysis result as described herein.

Further, in some examples, the expiration policy manager 124 is configured to store one or more expiration time intervals for use in managing the analysis results data store 106 as described herein. In some such examples, the manager 124 stores a single expiration time interval as a parameter or other type of stored value, while in other examples, the manager 124 stores multiple expiration time intervals in a data table or other structure, such each of the multiple expiration time intervals is associated with a customer identity or other data value that can be used as a key to identify the expiration time intervals. Additionally, or alternatively, the expiration time interval(s) of the expiration policy manager 124 are defined manually by a user or other entity, or they are defined in some other manner without departing from the description.

Figure 2:
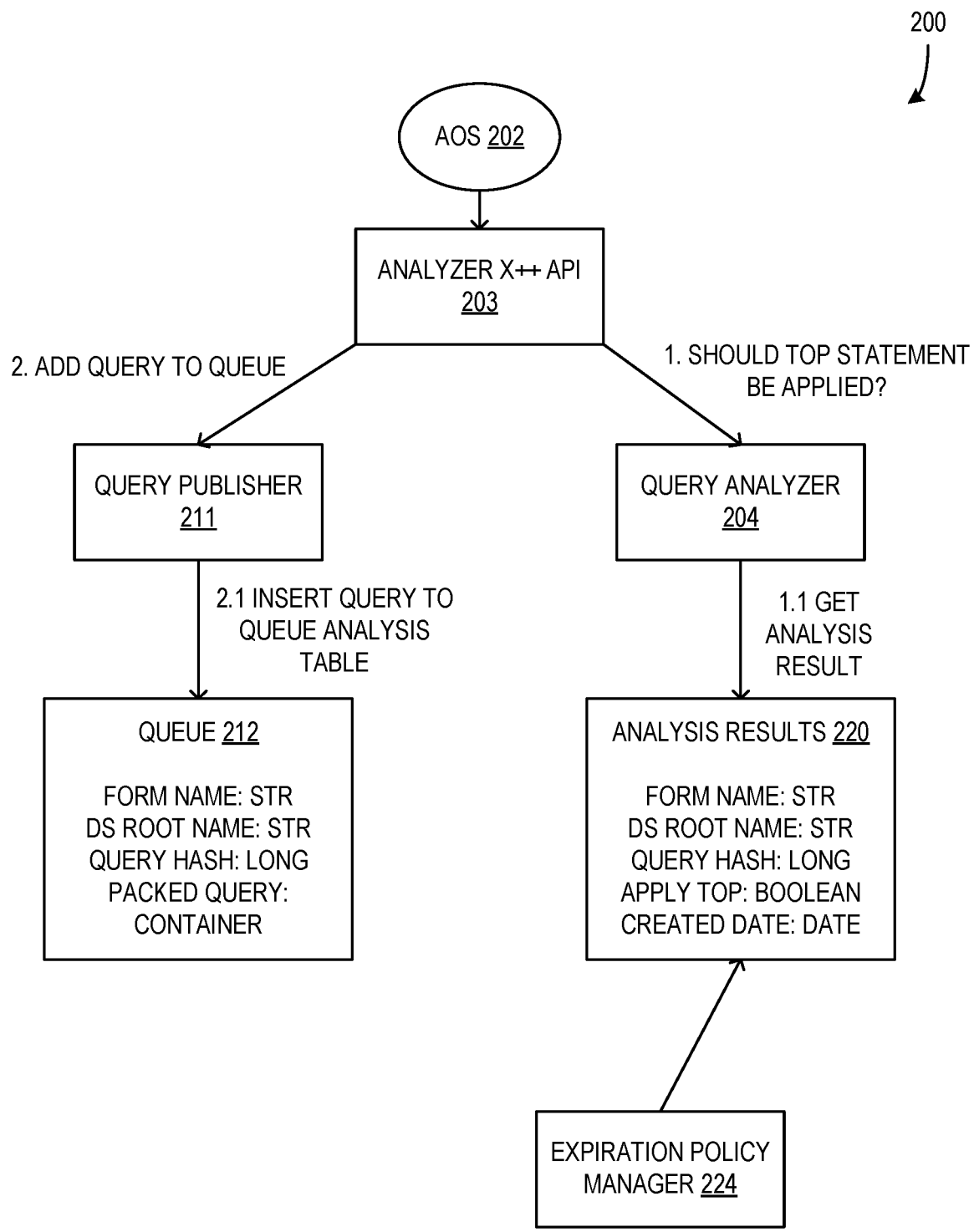
FIG. 2 is a diagram illustrating a query publisher and associated functionality.

FIG. 2 is a diagram 200 illustrating a query publisher and associated functionality. In some examples, the query publisher is part of a system such as system 100 of FIG. 1.

In some examples, the kernel 202 (e.g., an Advanced Operating System (AOS)) of a computing environment 102 calls the Analyzer X++ Application Programming Interface (API) 203 to determine whether a top statement (or other modification pattern) should be added to a query 108 that is to be executed in the computing environment 102. In the illustrated example, this call is directed to the query analyzer 204, which is configured to access analysis results 220. In some such examples, the call to the API includes a form name and/or a data source (DS) root name associated with the query. A form name may identify a web control or web page where the information is presented as a list in a web page, for example. A data source (DS) can be a table, or a set of tables, a SQL view, and/or a combination of tables and views, for example. A DS root name identifies the primary DS, or root DS, of the query. The form name and/or the DS root name are used to identify the origin of the query. The query analyzer 204 obtains an analysis result 220 if one is available and provides a response to the API call that indicates whether the top statement should be added to the query.

Additionally, or alternatively, the kernel 202 calls the API 203 to add a query to the query queue 212 (e.g., the query queue 112). This API call uses the query publisher 211 to insert the query into the query queue 212, which includes entries of query data including form names, DS root names, query hash values, and packed query containers or indicators thereof. In some examples, the kernel 202 calls the API 203 to add a query to the queue 212 whenever a query is executed. In some such examples, the disclosure determines whether to add such a query to the queue by determining if the query has been analyzed in the last expiration time interval of analysis results in the data store 106 (e.g., using the expiration policy manager 224). For instance, if the expiration time interval is 10 days, the disclosure determines whether an active analysis result 220 is already present in the data store and, if there is a result 220, the query is not added to the queue 212. Alternatively, if there is not an active analysis result 220, the query is added to the queue 212. Further, in some examples, queries added to the queue 212 are first packed into a container for storage in the queue 212.

Figure 3:
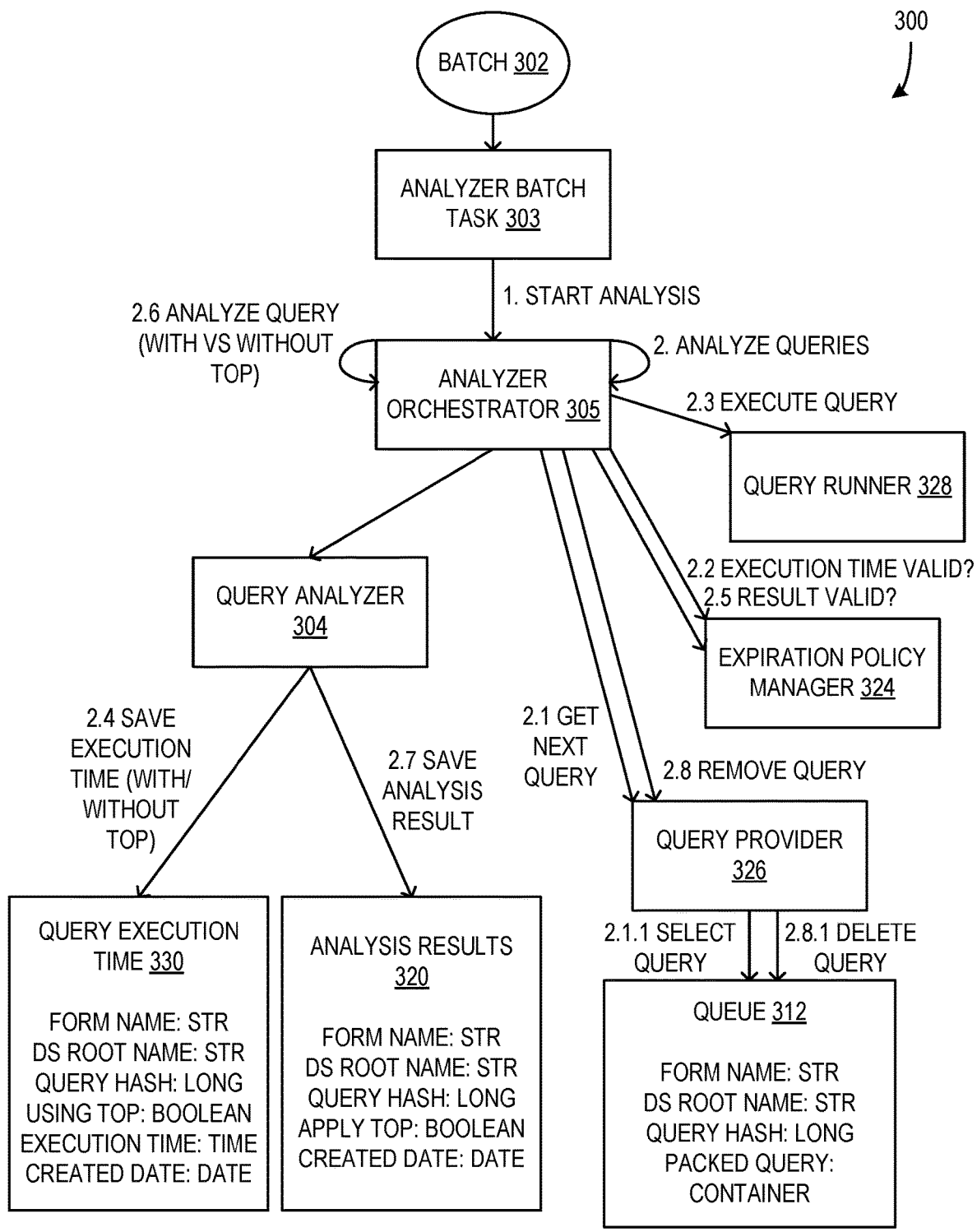
FIG. 3 is a diagram illustrating a query analyzer system and associated functionality.

FIG. 3 is a diagram illustrating a query analyzer system 300 and associated functionality. In some examples, the query analyzer (e.g., the query analyzer 104) is part of a system such as system 100 of FIG. 1.

In some examples, the query analyzer system 300 is configured to analyze queries in batches 302 based on an analyzer batch task 303. The analyzer orchestrator 305 facilitates the analysis of the batch 302 of queries by getting a next query in the batch 302 from a queue 312 using the query provider 326, and providing it to the query analyzer system 300, which unpacks the query (e.g., deserializing or otherwise removing data of the query from a container data structure and restoring it to an executable query format) and executes the unmodified and modified instances of the query via the Query Runner 328. The execution times (e.g., see the Query Execution Time 330 including data fields for Form name, DS root name, Query hash, a using top indicator, an execution time value, and a Created date timestamp) and/or other performance metrics of the executions are saved and an analysis result 320 is generated (e.g., see the Analysis Results box including data fields for Form name, DS root name, Query hash, an Apply Top indicator, and a Created date timestamp).

In some examples, the orchestrator 305 confirms with the expiration policy manager 324 that an active analysis result 320 for the query is not present in the data store prior to enabling the query analyzer 304 to analyze the query as described herein. The orchestrator 305 calls the expiration policy manager 324 to check whether the analysis result 320 of the query is present, expired, or not found in the data store. In other words, the expiration policy manager 324 verifies whether the results 320 are present and not expired. A result 320 may be considered valid if it is present and not expired. If the expiration policy manager 324 determines the analysis result 320 is not valid, that is the result 320 is not present, or is expired, the orchestrator 305 enables the query analyzer 304 to analyze the query. Further, after the analysis result 320 is generated by the query analyzer 304, the result 320 is validated by the expiration policy manager 324. In some such examples, inactive analysis results 320 are deleted or otherwise removed from the data store at this point. Alternatively, or additionally, in some examples, newly generated analysis results 320 are stored in the data store such that they replace expired or otherwise inactive analysis results 320 associated with the same queries.

After the query has been analyzed, the analyzer orchestrator 305 removes the query from the queue 312. The next query in the batch 302 is then obtained and processed as described herein. In some examples, the batch analysis operations are performed once a day.

Figure 4:
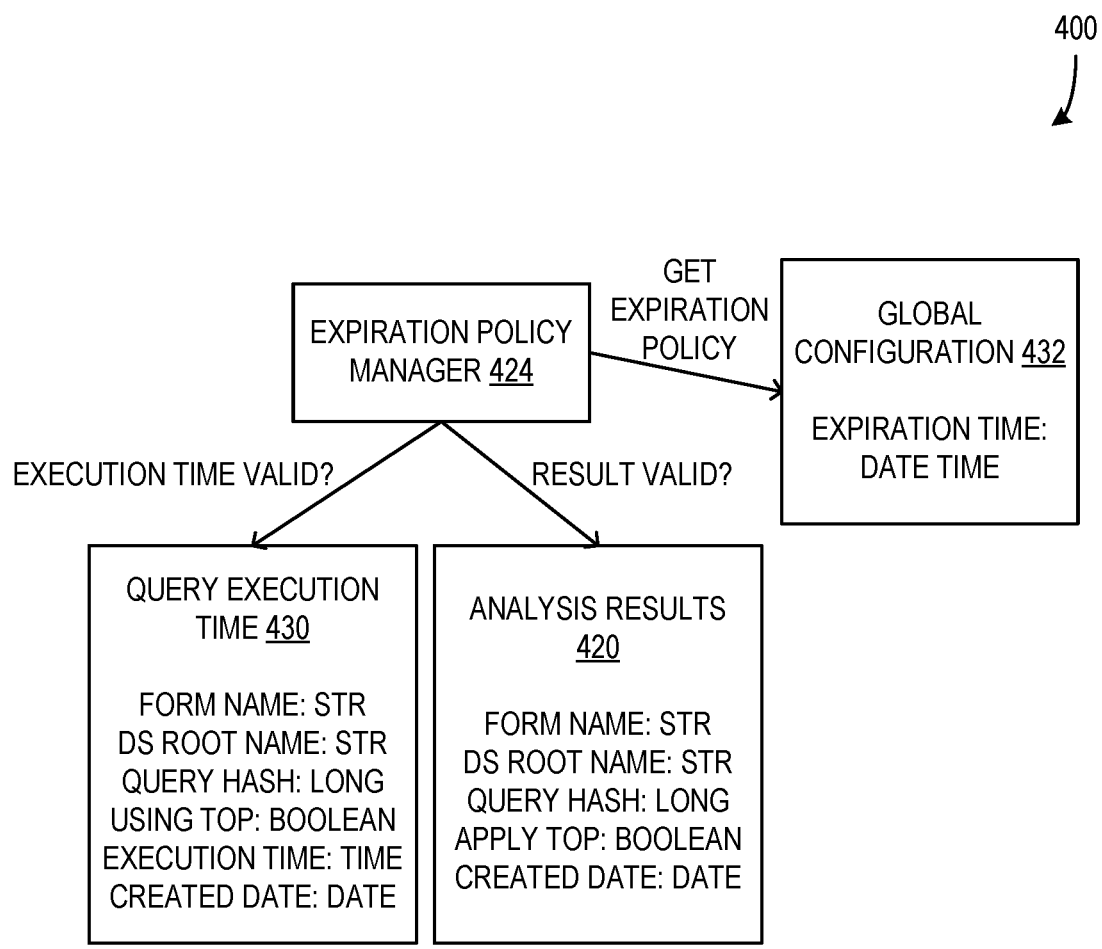
FIG. 4 is a diagram illustrating an expiration policy manager and associated functionality.

FIG. 4 is a diagram 400 illustrating an expiration policy manager 424 and associated functionality. In some examples, the expiration policy manager 424 (e.g., the expiration policy manager 124) is part of a system such as system 100 of FIG. 1. In some examples, the expiration policy manager 424 is configured to validate the execution times 430 of instances from the query analyzer and to validate the analysis results 420 generated by the query analyzer. Further, the expiration policy manager 424 is configured to obtain the defined expiration time interval for analysis results 420 and apply that defined time interval to the analysis results 420 stored in the data store. In some examples, the expiration policy manager 424 obtains the expiration time interval from a set of global configuration 432 parameters of the system. Alternatively, or additionally, the expiration policy manager 424 stores the expiration time interval as a local parameter or data value without departing from the description.

FIG. 5 is a diagram 500 illustrating the data tables of various data entities used in FIGS. 2-4. The data entities include a Queue 512, a Query Execution Time 530, Analysis Results 520, and a List Page Query 534 data contract. The Queue 512 includes fields for form name, DS root name, query hash value, and a packed query indicator. The Query Execution Time 530 includes fields for form name, ds root name, query hash value, execution timestamp, and a created date timestamp. The Analysis Results 520 table includes fields for form name, ds root name, query hash value, an Apply Top indicator, and a created date timestamp. The List Page Query 534 data contract includes fields for form name, ds root name, query hash value, and a Query object.

Figure 6:
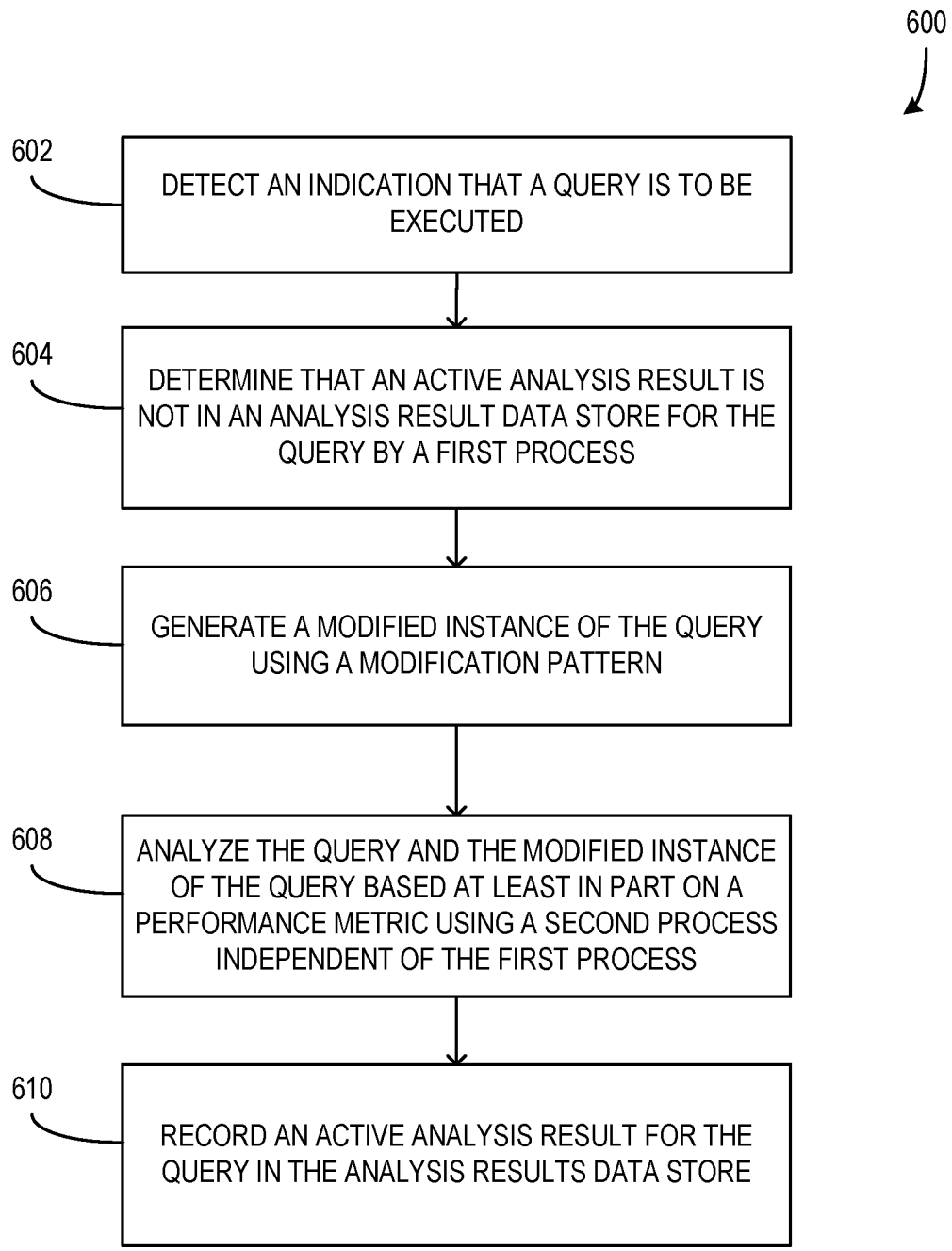
FIG. 6 is a flowchart illustrating a computerized method for analyzing a query.

FIG. 6 is a flowchart illustrating a computerized method 600 for analyzing a query (e.g., a query 108). In some examples, the computerized method 600 is executed or otherwise performed in a system such as system 100 of FIG. 1.

At 602, an indication is detected that indicates that a query is to be executed by a first process. In some examples, the kernel and/or operating system is configured to detect and/or provide notification that a query is to be executed. Further, in some examples, the first process by which the query is to be executed is a main or primary operating process of the computing system.

At 604, it is determined that an active analysis result for the query is not available in the analysis data store. Based at least in part on an active analysis result not being available, the analysis process for the query is initiated.

At 606, a modified instance of the query is generated using a modification pattern and, at 608, the query and the modified instance of the query are analyzed based at least in part on a performance metric using a second process independent of the first process. In some examples, each of the query and the modified instance of the query are executed and performance metric values, such as execution time, are collected based on those query executions. Further, in some examples, the analysis of the query occurs independently of the first process such that the first process is not interrupted by the query analysis. In some examples, the independently occurring analysis occurs in parallel with the operations of the first process. Additionally, or alternatively, the independently occurring analysis of the query occurs at a later time (e.g., in a batch of queries being analyzed once per day) while the process that is to execute the query continues operating without being interrupted.

At 610, an active analysis result for the query is recorded in the analysis results data store. In some examples, the active analysis result is generated based on the analysis of the executions of the query and the modified instance of the query, wherein the analysis result indicates whether the query should be modified for future executions. If the modified instance of the query exceeded the performance of the query, the analysis result indicates that the query should be modified for future executions. Alternatively, if the query exceeded the performance of the modified instance of the query, the analysis result indicates that the query should be left unmodified for future executions.

In some examples, the computerized method 600 further comprises: executing the query in a default mode based at least in part on determining that the analysis results data store does not include an active analysis result for the query; and adding the query to an analysis queue, wherein analyzing the query is based at least in part on the query reaching a front of the analysis queue. In some examples, the default mode of the query is to execute the query without making modifications. Alternatively, in other examples, the default mode of the query is to modify the query using a modification pattern and then to execute the modified query. Further, in some examples, the execution of the query in the default mode is performed without waiting for or otherwise being interrupted by the queuing of the query for analysis (e.g., the process executing the query in default mode continues operating without being affected by the query being analyzed or being queued to be analyzed later).

In some examples, the computerized method 600 further comprises: detecting another indication that the query is to be executed; determining that the analysis results data store includes the active analysis result for the query, wherein the active analysis result indicates that the query should be modified using the modification pattern; modifying the query using the modification pattern; and executing the modified query.

In some examples of the computerized method 600, the recorded active analysis result in the analysis results data store includes an expiration time, wherein the expiration time is defined based at least in part on an active result time interval, and wherein the active analysis result becomes inactive at the expiration time.

In some examples of the computerized method 600, the analysis results data store is associated with a customer entity associated with the query to be executed, such that all analysis results in the analysis results data store are associated with the customer entity.

In some examples of the computerized method 600, the performance metric is a quantity of time taken to complete execution.

In some examples of the computerized method 600, the modification pattern includes adding a statement to the query to limit the quantity of results generated by the query.

Figure 7:
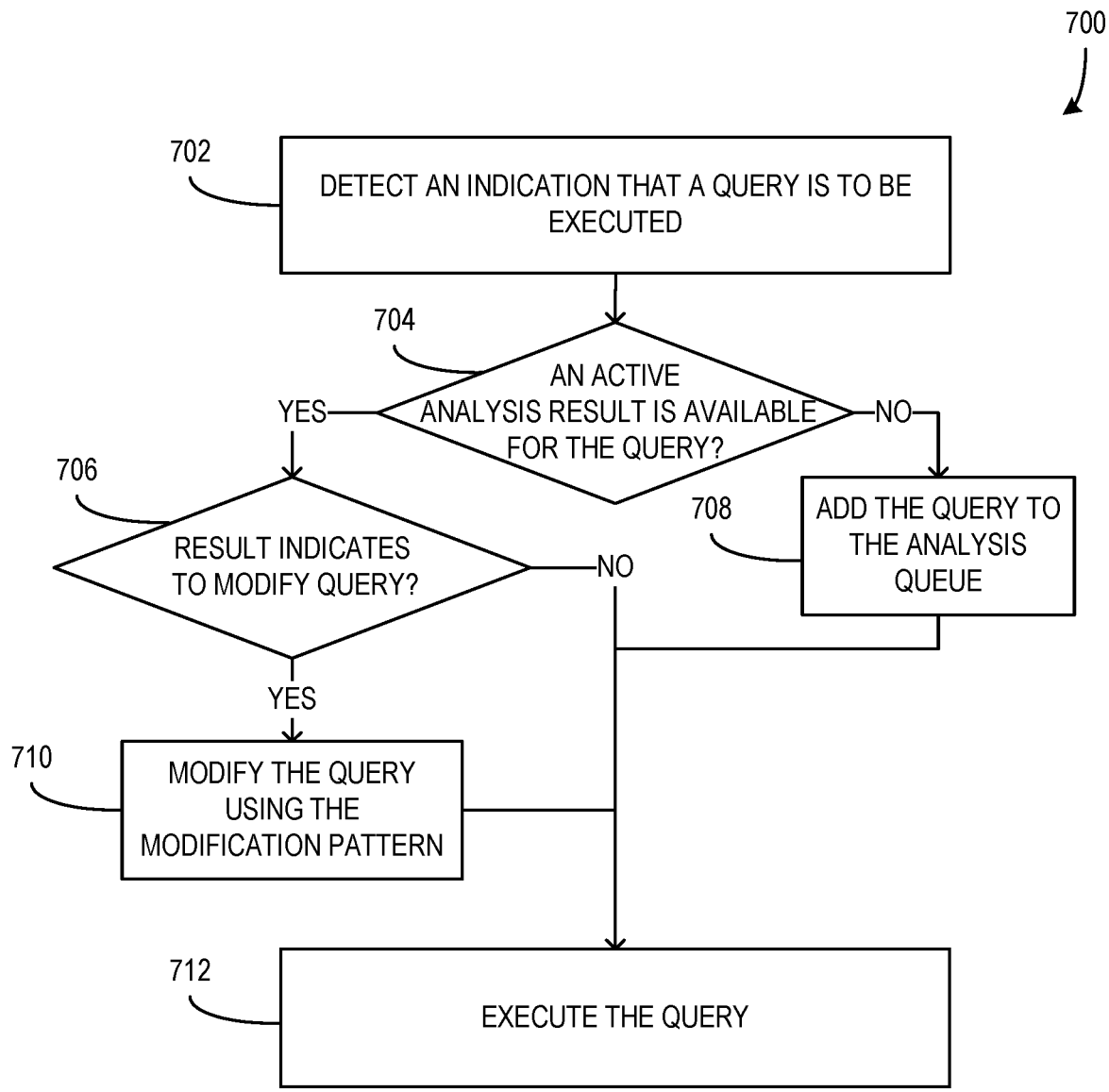
FIG. 7 is a flowchart illustrating a computerized method for executing queries based at least in part on query analysis.

FIG. 7 is a flowchart illustrating a computerized method 700 for executing queries (e.g., queries 108) based at least in part on query analysis. In some examples, the computerized method 700 is executed or otherwise performed in a system such as system 100 of FIG. 1.

At 702, an indication is detected that indicates that a query is to be executed. It should be understood that, in some examples, this indication detection is performed in substantially the same manner as the process described above with respect to 602 of FIG. 6. If, at 704, an active analysis result is available for the query, the process proceeds to 706. Alternatively, if an active analysis result is not available, the process proceeds to 708.

At 706, if the result indicates to modify the query, the process proceeds to 710. Alternatively, if the result does not indicate to modify the query, the process proceeds to 712.

At 708, the query is added to the analysis queue. In some examples, this includes the computing environment sending the query to a query analyzer, where it is added to a queue of queries to be analyzed, as described herein. The process then proceeds to 712.

At 710, after determining that the analysis result indicates that the query should be modified, the query is modified using the modification pattern. In some examples, this includes adding a top statement to the query (e.g., an SQL query). The process then proceeds to 712.

At 712, the query is executed. In some examples, the query has been modified at 710 and so the modified query is executed. Alternatively, if the query has not been modified, the unmodified query is executed.

In some examples, after the query is analyzed based on being added to the queue at 708, an analysis result is added to the analysis results data store (e.g., data store 106), such that, for future executions of the query, the process proceeds to 706 from 704, rather than to 708 from 704.

Further, in some examples, the method 700 is performed by the primary process, or the first process as described above with respect to FIG. 6, such that the query is queued for analysis at 708, but the actual performance of the analysis of the queued query is independent of the process that performs the method 700.

Figure 8:
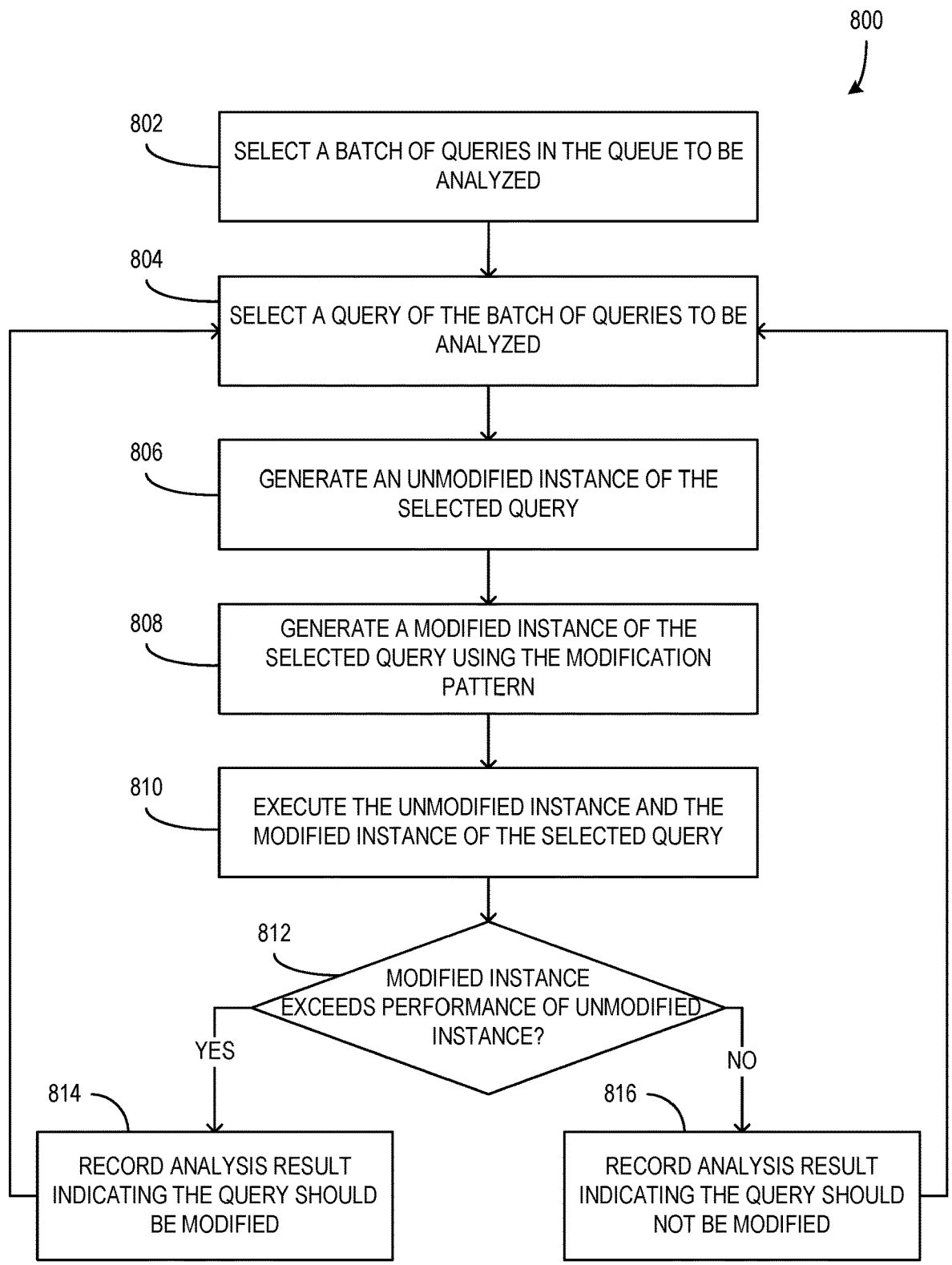
FIG. 8 is a flowchart illustrating a computerized method for analyzing queries.

FIG. 8 is a flowchart illustrating a computerized method 800 for analyzing queries. In some examples, the computerized method 800 is executed or otherwise performed in a system such as system 100 of FIG. 1.

At 802, a batch of queries 114 in the query queue 112 are selected to be analyzed. At 804, a query is selected from the batch of selected queries.

At 806, an unmodified instance of the selected query is generated and, at 808, a modified instance of the selected query is generated using a modification pattern.

At 810, the unmodified instance and the modified instance of the selected query are executed. In some examples, performance metrics are collected during and/or based on the execution of the instances as described herein.

At 812, if the modified instance exceeds the performance of the unmodified instance, the process proceeds to 814. Alternatively, if the modified instance does not exceed the performance of the unmodified instance, the process proceeds to 816.

At 814, an analysis result indicating that the query should be modified is recorded (e.g., in a data store 106) and the process returns to 804 to select the next query. Alternatively, at 816, an analysis result indicating that the query should not be modified is recorded and the process returns to 804 to select the next query.

Additional Examples

In some examples, the disclosure describes a framework in which the kernel inserts the identified queries into a system table named FormRecordLimitAnalyzerQueue (e.g., the query queue 112). This framework also enables a system batch job called FormRecordLimitAnalyzerBatchTask (e.g., a batch job executed in the query analyzer 104), which runs the query analysis for the queries added to the FormRecordLimitAnalyzerQueue table. The analyzer batch job executes the queries twice, one time WITHOUT the top statement (e.g., the original query, or the unmodified query instance 116) and one with the top statement (e.g., the alternate query form, or the modified query instance 118). The analyzer stores the time of both executions in the table FormRecordLimitAnalyzerExecutionTime (in examples where time of execution is the performance metric 122), and the query analysis results (e.g., the analysis results 120) in the table FormRecordLimitAnalyzerResult (e.g., the analysis results data store 106).

Further, in some such examples, each form query will have one entry in this FormRecordLimitAnalyzerResult, and the field ApplyTopStatementRecommendation indicates the recommendation to apply a top statement to the query or to leave the query unmodified. A positive indication in the recommendation field indicates the query was faster with the top statement and the analyzer recommends applying a top statement to this query. A negative indication in the recommendation field indicates the query was not faster with the top statement, and the analyzer does not recommend applying a top statement to this query.

In some examples, the disclosure describes using a top statement as the modification pattern, which limits the quantity of results the modified query will return when it is executed. In other examples, more and/or different modification patterns are used without departing from the description. For instance, in some examples, two different top statements are considered (e.g., one top statement that limits the quantity of returned results to 50,000 results and another top statement that limits the quantity of returned results to 100,000 results). Other modification patterns (e.g., a modification that limits the set of data to which a query is applied to improve the execution time and/or reduce the resources consumed during execution; obtaining data in a different way; recomputing the whole aggregations; or storing partial aggregations and doing a differential aggregation at runtime and combining the results) can also be defined that potentially improve the performance of some queries and those other modification patterns are used to analyze and improve query performance as described herein without departing from the description.

In some examples, the disclosed framework generates an analysis result 120 that indicates that a modified version of the query should be used based on the modified query instance 118 exceeding the unmodified query instance 116 in performance during the analysis (e.g., the modified query instance 118 executed in 55 seconds and the unmodified query instance 116 executed in 60 seconds). However, in some examples and/or for some performance metrics 122, the framework is configured to only recommend the use of a modified query if the modified query instance 118 exceeds the performance of the unmodified query instance 116 by some defined margin or threshold. For instance, in an example where the performance metric 122 is execution time, a threshold is defined that indicates that query modification is only recommended when the execution time of the modified query instance 118 is less than or equal to 85% of the execution time of the unmodified query instance 116. In such an example, a modified query time of 55 seconds and an unmodified query time of 60 seconds would result in the unmodified query being recommended, while a modified query time of 40 seconds and an unmodified query time of 60 seconds would result in the modified query being recommended. In such cases, it may be preferable to not modify the query if it only provides minor or insignificant performance improvements.

In some examples, the disclosed framework uses other performance metrics 122, such as processing resource usage, memory usage, and/or bandwidth usage. In this way, the resources of the computing environment 102 can be better managed by executing some modified queries to reduce resource usage during query execution.

In some examples, the disclosed framework is configured to identify queries using hash values. The hash values are generated using a hash function and the text data of the query, such that hash values generated for a query are consistently identical and hash values generated for different queries are different values. In some such examples, the hash function is applied to the text data of the query with parameter and/or variable text removed or ignored, such that queries that are structurally the same but have differing variable values yield the same hash value. For instance, if a query includes text data indicative of a variable datetime range, the datetime values in the variable datetime range in one instance of the query are ignored when generating the hash value to avoid generating different hash values for two queries that are the same structurally but have different datetime values.

In some examples, the disclosed framework uses machine learning techniques to improve performance. For instance, in an example, a customer frequently executes a query that is applied to either a first set of data or a second set of data (e.g., a customer that frequently queries sales data from a first region and a second region). The performance of the query on the first set of data indicates that the query should not be modified while the performance of the query on the second set of data indicates that the query should be modified. In some such examples, the disclosed framework is configured to use the frequent executions of the query on the two different data sets to learn that the different data sets result in different performance metrics. Machine learning techniques can then be used to identify the query when it is to be executed, determine which data set it will be applied to, and then take steps to either modify the query or leave it unmodified based on the determined data set. Thus, machine learning techniques can be used to identify patterns in the input of queries, rather than just identifying the query itself, in order to better fine tune the determination as to whether to modify a query before execution.

Exemplary Operating Environment

The present disclosure is operable with a computing apparatus according to an embodiment as a functional block diagram 900 in FIG. 9. In an example, components of a computing apparatus 918 are implemented as a part of an electronic device according to one or more embodiments described in this specification. The computing apparatus 918 comprises one or more processors 919 which may be microprocessors, controllers, or any other suitable type of processors for processing computer executable instructions to control the operation of the electronic device. Alternatively, or in addition, the processor 919 is any technology capable of executing logic or instructions, such as a hardcoded machine. In some examples, platform software comprising an operating system 920 or any other suitable platform software is provided on the apparatus 918 to enable application software 921 to be executed on the device. In some examples, dynamically modifying queries that are to be executed based on independently performed query analysis as described herein is accomplished by software, hardware, and/or firmware.

In some examples, computer executable instructions are provided using any computer-readable media that are accessible by the computing apparatus 918. Computer-readable media include, for example, computer storage media such as a memory 922 and communications media. Computer storage media, such as a memory 922, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 922) is shown within the computing apparatus 918, it will be appreciated by a person skilled in the art, that, in some examples, the storage is distributed or located remotely and accessed via a network or other communication link (e.g., using a communication interface 923).

Further, in some examples, the computing apparatus 918 comprises an input/output controller 924 configured to output information to one or more output devices 925, for example a display or a speaker, which are separate from or integral to the electronic device. Additionally, or alternatively, the input/output controller 924 is configured to receive and process an input from one or more input devices 926, for example, a keyboard, a microphone, or a touchpad. In one example, the output device 925 also acts as the input device. An example of such a device is a touch sensitive display. The input/output controller 924 may also output data to devices other than the output device, e.g., a locally connected printing device. In some examples, a user provides input to the input device(s) 926 and/or receive output from the output device(s) 925.

The functionality described herein can be performed, at least in part, by one or more hardware logic components. According to an embodiment, the computing apparatus 918 is configured by the program code when executed by the processor 919 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: a processor; and a memory comprising computer program code, the memory and the computer program code configured to, with the processor, cause the processor to: detect an indication that a query is to be executed by a first process; determine that an analysis results data store does not include an active analysis result for the query using a query identifier of the query; generate a modified instance of the query using a modification pattern; analyze the query and the modified instance of the query based at least in part on a performance metric using a second process independent of the first process; and record an active analysis result for the query in the analysis results data store, wherein the active analysis result indicates whether future executions of the query should be modified using the modification pattern based at least in part on a result of analyzing the query.

An example computerized method comprises: detecting an indication that a query is to be executed by a first process; determining that an analysis results data store does not include an active analysis result for the query using a query identifier of the query; generating a modified instance of the query using a modification pattern; analyzing the query and the modified instance of the query based at least in part on a performance metric using a second process independent of the first process; and recording an active analysis result for the query in the analysis results data store, wherein the active analysis result indicates whether future executions of the query should be modified using the modification pattern based at least in part on a result of analyzing the query.

One or more computer storage media having computer-executable instructions that, upon execution by a processor, cause the processor to at least: detect an indication that a query is to be executed by a first process; determine that an analysis results data store does not include an active analysis result for the query using a query identifier of the query; generate a modified instance of the query using a modification pattern; analyze the query and the modified instance of the query based at least in part on a performance metric using a second process independent of the first process; and record an active analysis result for the query in the analysis results data store, wherein the active analysis result indicates whether future executions of the query should be modified using the modification pattern based at least in part on a result of analyzing the query.

Alternatively, or in addition to the other examples described herein, examples include any combination of the following:

- further comprising: executing the query in a default mode using the first process based at least in part on determining that the analysis results data store does not include an active analysis result for the query; and adding the query to an analysis queue, wherein analyzing the query is based at least in part on the query reaching a front of the analysis queue.
- further comprising: detecting another indication that the query is to be executed; determining that the analysis results data store includes the active analysis result for the query, wherein the active analysis result indicates that the query should be modified using the modification pattern; modifying the query using the modification pattern; and executing the modified query.
- wherein the recorded active analysis result in the analysis results data store includes an expiration time, wherein the expiration time is defined based at least in part on an active result time interval, and wherein the active analysis result becomes inactive at the expiration time.
- wherein the analysis results data store is associated with a customer entity associated with the query to be executed, such that all analysis results in the analysis results data store are associated with the customer entity.
- wherein the performance metric is a quantity of time taken to complete execution.
- wherein the modification pattern includes adding a statement to the query to limit a quantity of results generated by the query.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for detecting an indication that a query is to be executed by a first process; an exemplary means for determining that an analysis results data store does not include an active analysis result for the query using a query identifier of the query; an exemplary means for generating a modified instance of the query using a modification pattern; an exemplary means for analyzing the query and the modified instance of the query based at least in part on a performance metric using a second process independent of the first process; and an exemplary means for recording an active analysis result for the query in the analysis results data store, wherein the active analysis result indicates whether future executions of the query should be modified using the modification pattern based at least in part on a result of analyzing the query.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
 a first computing device that includes hardware designed to execute Structured Query Language (SQL) queries; and
 one or more second computing devices that include hardware designed to store the SQL queries; and
 an application programming interface (API) for receiving calls, from a kernel of the first computing device, for modification patterns stored by the one or more second computing devices, wherein the first computing device is configured to perform an initial execution of an SQL query during a primary process,
 wherein the one or more second computing devices are configured to:
  detect an execution performance of the SQL query based on the initial execution of the SQL query during the primary process;
  determine that an analysis results data store does not include any active analysis results for the SQL query using a query identifier of the SQL query;
  generate a modified instance of the SQL query using a modification pattern;
  execute the modified instance of the SQL query during a background process that is independent from the primary process;
  detect an execution performance of the modified instance of the SQL query based on execution of the modified instance of the SQL query during the background process, wherein execution of the modified instance of the SQL query during the background process does not interrupt the primary process;
  compare the detected execution performance of the SQL query with the detected execution performance of the modified instance of the SQL query to obtain an active analysis result for the SQL query; and
  record the active analysis result for the SQL query in the analysis results data store, wherein the active analysis result indicates whether future executions of the SQL query should be modified using the modification pattern, and
 wherein the first computing device is further configured to:
  send a call from the kernel of the first computing device to the API to determine that the SQL query should be modified using the modification pattern;
  modify the query using the modification pattern; and
  perform a future execution of the SQL query by executing the modified SQL query during the primary process.

2. The system of claim 1, wherein the active analysis result recorded in the analysis results data store includes an expiration time, wherein the expiration time is defined based at least in part on an active result time interval, and wherein the active analysis result becomes inactive at the expiration time.

3. The system of claim 1, wherein the analysis results data store is associated with a customer entity associated with the SQL query to be executed, such that all analysis results in the analysis results data store are associated with the customer entity.

4. The system of claim 1, wherein the detected execution performance of the SQL query is a quantity of time taken to complete execution of the SQL query by the primary process, and wherein the detected execution performance of the modified instance of the SQL query is a quantity of time taken to complete execution of the modified instance of the SQL query by the background process.

5. The system of claim 1, wherein the modification pattern includes adding a statement to the SQL query to limit a quantity of results generated by the SQL query.

6. A computerized method comprising:
 performing, by a first computing device, an initial execution of an Structured Query Language (SQL) query during a primary process, the first computing device including hardware designed to execute SQL queries, wherein an application programming interface (API) is configured to receive calls, from a kernel of the first computing device, for modification patterns stored by one or more second computing devices that include hardware designed to store the SQL queries;

detecting, by the one or more second computing devices, an execution performance of the SQL query based on the initial execution of the SQL query during the primary process;

determining, by the one or more second computing devices, that an analysis results data store does not include any active analysis results for the SQL query using a query identifier of the SQL query;

generating, by the one or more second computing devices, a modified instance of the SQL query using a modification pattern;

executing, by the one or more second computing devices, the modified instance of the SQL query during a background process that is independent from the primary process;

detecting, by the one or more second computing devices, an execution performance of the modified instance of the SQL query based on execution of the modified instance of the SQL query during the background process, wherein execution of the modified instance of the SQL query during the background process does not interrupt the primary first process;

comparing, by the one or more second computing devices, the detected execution performance of the SQL query with the detected execution performance of the modified instance of the SQL query to obtain an active analysis result for the SQL query;

recording, by the one or more second computing devices, the active analysis result for the SQL query in the analysis results data store, wherein the active analysis result indicates whether future executions of the SQL query should be modified using the modification pattern;

sending, by the kernel of the first computing device, a call to the API to determine that the SQL query should be modified using the modification pattern;

modifying, by the first computing device, the query using the modification pattern; and performing, by the first computing device, a future execution of the SQL query by executing the modified SQL query during the primary process.

7. The computerized method of claim 6, wherein the active analysis result recorded in the analysis results data store includes an expiration time, wherein the expiration time is defined based at least in part on an active result time interval, and wherein the active analysis result becomes inactive at the expiration time.

8. The computerized method of claim 6, wherein the analysis results data store is associated with a customer entity associated with the SQL query to be executed, such that all analysis results in the analysis results data store are associated with the customer entity.

9. The computerized method of claim 6, wherein the detected execution performance of the SQL query is a quantity of time taken to complete execution of the SQL query by the primary process, and wherein the detected execution performance of the modified instance of the SQL query is a quantity of time taken to complete execution of the modified instance of the SQL query by the background process.

10. One or more computer storage media having computer-executable instructions that, upon execution by processors, cause the processors to at least:

perform, by a first computing device, an initial execution of an Structured Query Language (SQL) query during a primary process, the first computing device including hardware designed to execute SQL queries, wherein an application programming interface (API) is configured to receive calls, from a kernel of the first computing device, for modification patterns stored by one or more second computing devices that include hardware designed to store the SQL queries;

detect, by the one or more second computing devices, an execution performance of the SQL query based on the initial execution of the SQL query during the primary process;

determine, by the one or more second computing devices, that an analysis results data store does not include any active analysis results for the SQL query using a query identifier of the SQL query;

generate, by the one or more second computing devices, a modified instance of the SQL query using a modification pattern a modified instance of the query using a modification pattern;

execute, by the one or more second computing devices, the modified instance of the SQL query during a background process that is independent from the primary process;

detect, by the one or more second computing devices, an execution performance of the modified instance of the SQL query based on execution of the modified instance of the SQL query during the background process, wherein execution of the modified instance of the SQL query during the background process does not interrupt the primary process;

compare, by the one or more second computing devices, the detected execution performance of the SQL query with the detected execution performance of the modified instance of the SQL query to obtain an active analysis result for the SQL query;

record, by the one or more second computing devices, the active analysis result for the SQL query in the analysis results data store, wherein the active analysis result indicates whether future executions of the SQL query should be modified using the modification pattern;

send, by the kernel of the first computing device, a call to the API to determine that the SQL query should be modified using the modification pattern;

modify, by the first computing device, the query using the modification pattern; and perform, by the first computing device, a future execution of the SQL query by executing the modified SQL query during the primary process.

11. The one or more computer storage media of claim 10, wherein the active analysis result recorded in the analysis results data store includes an expiration time, wherein the expiration time is defined based at least in part on an active result time interval, and wherein the active analysis result becomes inactive at the expiration time.

12. The one or more computer storage media of claim 10, wherein the analysis results data store is associated with a customer entity associated with the SQL query to be executed, such that all analysis results in the analysis results data store are associated with the customer entity.

13. The one or more computer storage media of claim 10, wherein the detected execution performance of the SQL query is a quantity of time taken to complete execution of the SQL query by the primary first process, and wherein the detected execution performance of the modified instance of the SQL query is a quantity of time taken to complete execution of the modified instance of the SQL query by the background process.

* * * * *